(12) United States Patent
Chen et al.

(10) Patent No.: US 8,159,138 B2
(45) Date of Patent: Apr. 17, 2012

(54) LED DRIVING TOPOLOGY, LIGHT SOURCE MODULE BASED THEREON, AND DIGITAL CAMERA HAVING THE SAME

(75) Inventors: Chun-Tsung Chen, Taipei (TW); Chun-Hsiung Chang, Zhubei (TW); Tsan-Huei Wu, Shuilin Shiang (TW); Shih-Hui Chen, Kaohsiung (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 551 days.

(21) Appl. No.: 12/379,951

(22) Filed: Mar. 5, 2009

(65) Prior Publication Data
US 2009/0195187 A1    Aug. 6, 2009

(30) Foreign Application Priority Data
May 2, 2008    (TW) .............................. 97116231 A

(51) Int. Cl.
*G09G 3/10*    (2006.01)
(52) U.S. Cl. ...................... 315/169.1; 315/160; 315/164; 315/185 R; 315/291; 345/82; 345/92; 345/95; 345/211; 345/212; 323/282

(58) Field of Classification Search .................. 315/160, 315/163, 164, 169.1, 169.3, 185 R, 291, 307, 315/312, 161, 247; 345/82, 92, 95, 204, 345/211, 96, 212; 323/222, 224, 282
See application file for complete search history.

(56) References Cited

U.S. PATENT DOCUMENTS

| | | | |
|---|---|---|---|
| 5,313,187 A * | 5/1994 | Choi et al. | 340/331 |
| 7,154,252 B2 * | 12/2006 | Arthur | 323/282 |
| 7,281,820 B2 * | 10/2007 | Bayat et al. | 362/245 |
| 7,583,244 B2 * | 9/2009 | Werner et al. | 345/82 |
| 7,658,510 B2 * | 2/2010 | Russell | 362/249.02 |
| 7,868,602 B2 * | 1/2011 | Omi et al. | 323/284 |
| 8,018,170 B2 * | 9/2011 | Chen et al. | 315/192 |
| 2006/0227085 A1 * | 10/2006 | Boldt et al. | 345/83 |
| 2009/0159686 A1 * | 6/2009 | Taylor et al. | 235/462.42 |
| 2011/0204797 A1 * | 8/2011 | Lin et al. | 315/161 |

* cited by examiner

*Primary Examiner* — Haiss Philogene
(74) *Attorney, Agent, or Firm* — Muncy, Geissler, Olds & Lowe, PLLC

(57) ABSTRACT

A LED driving topology includes a LED array and a current source connected in series between two power inputs receiving a positive voltage and a negative voltage respectively. This topology increases the voltage difference across the LED array and hence has the capability of lighting up more serially connected LEDs, without requiring an additional boost circuit or a high voltage. In addition, the circuit of the current source can be made by a low-voltage manufacturing process.

6 Claims, 4 Drawing Sheets

LED DRIVING TOPOLOGY, LIGHT SOURCE MODULE BASED THEREON, AND DIGITAL CAMERA HAVING THE SAME

FIELD OF THE INVENTION

The present invention is related generally to a LED driving topology and, more particularity, to a LED light source module for a digital camera.

BACKGROUND OF THE INVENTION

To turn on a light-emitting diode (LED), the voltage difference across the LED must exceed the cutoff voltage thereof. Nowadays, LED applications typically involve configuring a string of LEDs as a LED array, and in consequence a relatively high voltage is needed to drive the LED array. However, in some applications, particularly for portable or handheld devices, the number of serially connected LEDs in a LED array that can be driven is limited by the power source voltage provided by the power supplies of such devices. In order to provide higher voltage than the power source voltage for the LED driver, an additional boost circuit is required, and yet the use of the additional boost circuit is disadvantageous because of the increased cost and circuit volume. Moreover, as the driving voltage to be used becomes higher, it is necessary for the LED driver to have a circuit made by a high-voltage manufacturing process, which not only results in further increased cost and chip size, but also prevents the circuit from integration into low-voltage chips.

FIG. 1 is a circuit diagram of a conventional LED driver, which includes an inductor L, a power switch M and a diode D configured as a boost circuit to step up the power source voltage Vin so as to provide a higher voltage for a LED array 10. FIG. 2 is a circuit diagram of another conventional LED driver, which can be viewed as a controlled current source 12 whose current determines the brightness of a LED array 10. In the aforesaid topologies, the voltage difference across the LED array 10 is limited below the power source voltage Vin, and therefore the power source voltage Vin will limit the number of LEDs that can be lighted up. If the forward bias of a single LED is Vd, then the number N of such LEDs that can be lighted up is smaller than Vin/Vd. Assuming Vd=3.5V, three serially connected LEDs will require a driving voltage 10.5V. Hence, in existing topologies, the power source voltage Vin must be pumped up to a higher level for driving more serially connected LEDs in a light source for brighter lighting.

SUMMARY OF THE INVENTION

An object of the present invention is to provide a novel LED driving topology.

Another object of the present invention is to provide a low-cost LED light source module.

Yet another object of the present invention is to provide a digital camera using a LED light source.

According to the present invention, a LED driving topology includes a LED array and a current source connected in series between two power inputs that receive a positive voltage and a negative voltage respectively. This topology increases the voltage difference across the LED array and hence has the capability of lighting up more serially connected LEDs, without requiring an additional boost circuit or a high voltage. In addition, the circuit of the current source can be made by a low-voltage manufacturing process.

According to the present invention, a light source module includes a LED array and a current source connected in series between a first power input receiving a positive voltage and a second power input receiving a negative voltage, and a power supply to convert a power source voltage into the negative voltage.

Now that a digital camera is already equipped with a power supply to provide a negative voltage for the light sensor thereof, such as a charge-coupled device (CCD), the aforesaid light source module, when applied to a digital camera, can generate a great voltage difference across the LED array without requiring an additional boost circuit or a high voltage.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

The turn-on voltage of a LED is the voltage difference across the LED, rather than the absolute voltage at any single end thereof. In the conventional LED driving topology, as the low-voltage end of the LED array is grounded, the abovementioned limitation on applications ensues. According to the present invention, a novel LED driving topology is proposed, in which the low-voltage end of the LED array is applied with a negative voltage to overcome the abovementioned limitation.

Figure 1:
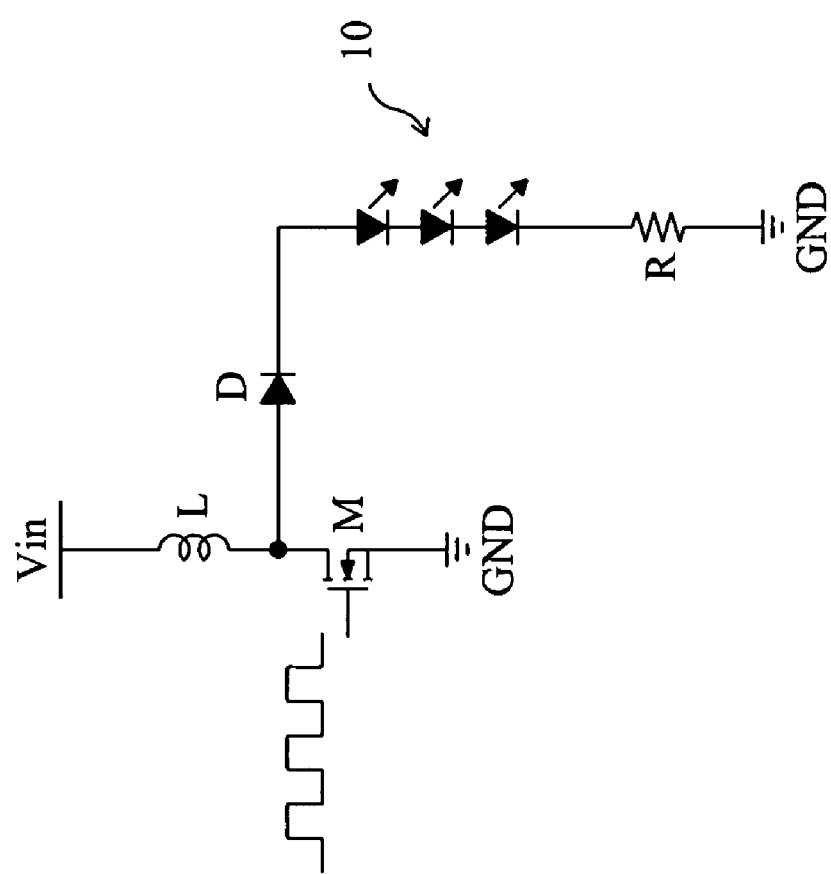
FIG. 1 is a circuit diagram of a conventional LED driver.
Figure 2:
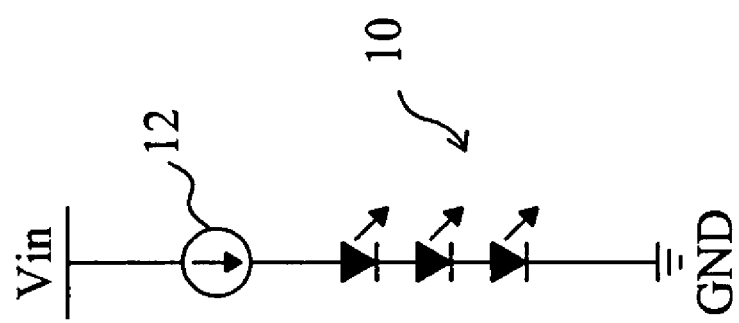
FIG. 2 is a circuit diagram of another conventional LED driver.
Figure 3:
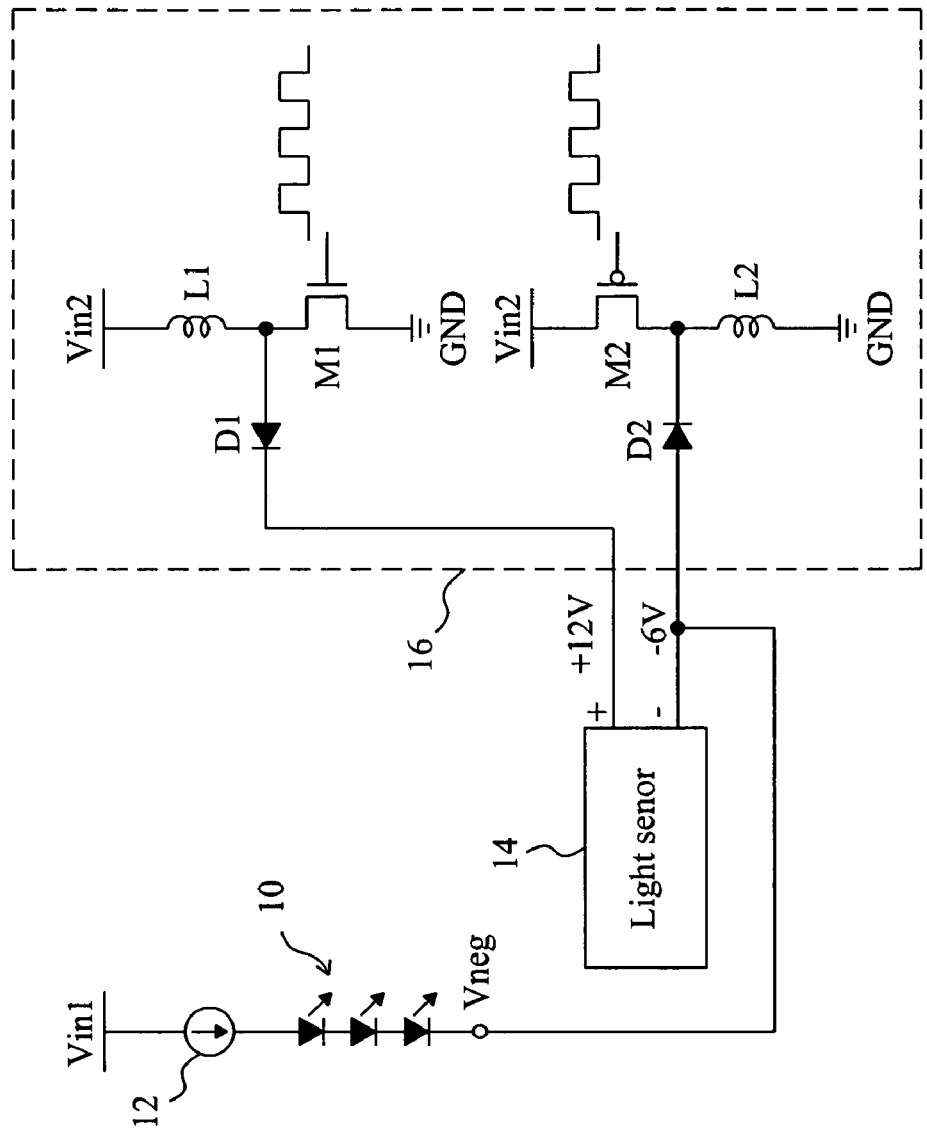
FIG. 3 is a circuit diagram showing an embodiment according to the present invention.
Figure 4:
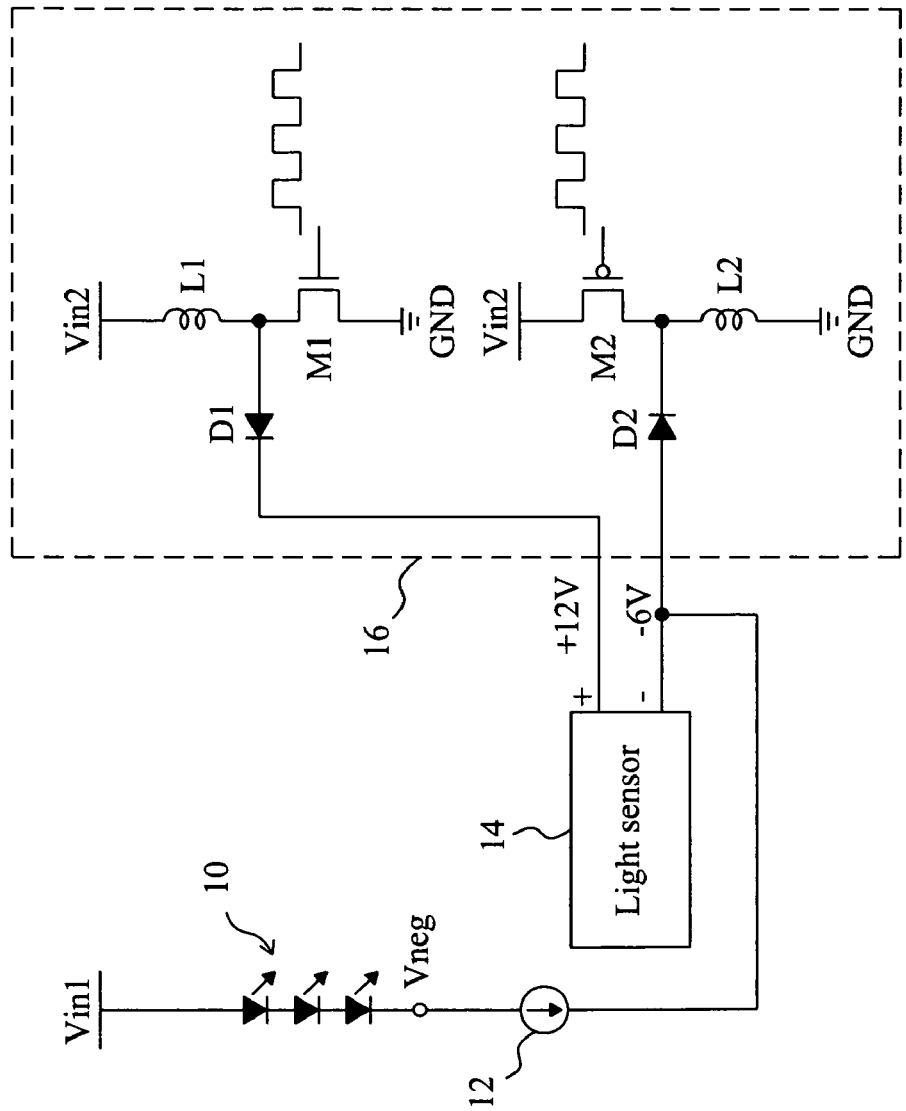
FIG. 4 is a circuit diagram showing an alternative of the embodiment of FIG. 3.

Taking a digital camera for example, FIG. 3 shows a LED light source module designed therefor. A general digital camera includes a light sensor 14, such as a CCD, that needs a positive voltage and a negative voltage for operation. For the positive voltage/negative voltage, typical specifications include +12V/−6V, +14V/−7V and +16V/−8V, and the specification +12V/−6V is exemplified in this embodiment. With the already equipped power supply 16 of the digital camera, the power source voltage Vin2 is converted into +12V by a boost circuit including an inductor L1, a power switch M1 and a diode D1, and is also converted into −6V by an inverting buck circuit including an inductor L2, a power switch M2 and a diode D2. These two voltages, namely +12V and −6V, are supplied to the light sensor 14. In addition, a LED array 10 and a current source 12 are connected in series between two power inputs, of which the high-voltage one receives a positive voltage Vin1, and the low-voltage one Vneg receives the negative voltage −6V produced by the power supply 16. The current source 12 is located adjacent to the positive-voltage input Vin1, as shown in FIG. 3, or adjacent to the negative-voltage input Vneg, as shown in FIG. 4. If Vin1 and Vin2 are both 12V, the voltage difference across the LED array 10 can reach 12+|−6|=18V. Thus, the number N of LEDs that can be driven is 5 (18/3.5=5.14). To drive the same five white LEDs with the conventional driving topology, it is required to pump up the power source voltage Vin1 from 12V to 18V. Compared with the conventional one, this embodiment is capable of driving five white LEDs at a lower cost because no additional boost circuits are needed.

In other embodiments, a lower power source voltage Vin1 can be used. For instance, if the voltage Vin1 is +6V, the voltage difference across the LED array 10 is 12V (6+|−6|=12), which is still sufficient to turn on three (12/3.5=3.4) white LEDs. Furthermore, since the driver that serves as the current source 12 needs not withstand a high voltage above +10V, a low-voltage integrated circuit manufacturing process can be adopted to reduce the cost and circuit size further.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A LED driving topology, comprising:
   a first power input receiving a positive voltage;
   a second power input receiving a negative voltage;
   a LED array connected between the first power input and the second power input; and
   a current source serially connected to the LED array.

2. A light source module, comprising:
   a first power input receiving a positive voltage;
   a second power input;
   a LED array connected between the first power input and the second power input;
   a current source serially connected to the LED array; and
   a power supply connected to the second power input to convert a power source voltage into a negative voltage applied to the second power input.

3. The light source module of claim 2, wherein the power supply comprises an inverting buck circuit converting the power source voltage into the negative voltage.

4. A digital camera, comprising:
   a light sensor;
   a first power input receiving a first positive voltage;
   a second power input;
   a LED array connected between the first power input and the second power input;
   a current source serially connected to the LED array; and
   a power supply connected to the light sensor to convert a power source voltage into a second positive voltage and a negative voltage both supplied to the light sensor, wherein the negative voltage is also applied to the second power input.

5. The digital camera of claim 4, wherein the power supply comprises:
   a boost circuit connected to the light sensor to convert the power source voltage into the second positive voltage; and
   an inverting buck circuit connected to the light sensor to convert the power source voltage into the negative voltage.

6. The digital camera of claim 4, wherein the light sensor comprises a CCD.

* * * * *